United States Patent [19]

Cappel et al.

[11] Patent Number: 4,668,522

[45] Date of Patent: May 26, 1987

[54] MIXING PROCESS FOR COOKIES WITH STORAGE-STABLE TEXTURE VARIABILITY

[75] Inventors: James W. Cappel, Fairfield; Richard N. Cronemiller, Hamilton, both of Ohio

[73] Assignee: The Procter & Gamble Company, Cincinnati, Ohio

[21] Appl. No.: 646,177

[22] Filed: Aug. 30, 1984

Related U.S. Application Data

[63] Continuation-in-part of Ser. No. 530,564, Sep. 9, 1983, abandoned.

[51] Int. Cl.$^4$ .......................... A21D 8/00; A21D 13/00
[52] U.S. Cl. ...................................... 426/94; 426/103; 426/549
[58] Field of Search ................. 426/549, 504, 94, 103, 426/502

[56] References Cited

U.S. PATENT DOCUMENTS

| | | |
|---|---|---|
| 2,524,437 | 11/1950 | Garnatz . |
| 3,759,717 | 9/1973 | Buddemeyer et al. . |
| 4,368,209 | 1/1983 | Tomlinson .......................... 426/504 |
| 4,455,333 | 6/1984 | Hong et al. . |
| 4,503,080 | 3/1985 | Brabbs et al. ....................... 426/502 |

OTHER PUBLICATIONS

Yamazaki, W. T., "The Concentration of a Factor in Soft Wheat Flours Affecting Cookie Quality", Cereal Chemistry, vol. 32, pp. 27-37 (1955).
Sollars, W. F., "Effects of the Water-Soluble Constituents of Wheat Flour on Cookie Diameter", Cereal Chemistry, vol. 36, pp. 498-513 (1959).
Yamazaki, W. T., "Interrelations Among Bread Dough Absorption, Cookie Diameter, Protein Content, and Alkaline Water Retention Capacity of Soft Winter Wheat Flours", Cereal Chemistry, vol. 31, pp. 135-142 (1954).
Yamazaki, W. T., "The Application of Heat in the Testing of Flours for Cookie Quality", Cereal Chemistry, vol. 36, pp. 59-69 (1959).
Finney, K. F., Yamazaki, W. T. & Morris, V. H., "Effects of Varying Quantities of Sugar, Shortening & Ammonium Bicarbonate on the Spreading & Top Grain of Sugar-Snap Cookies", Cereal Chemistry, vol. 27, pp. 30-41 (1950).
Yamazaki, W. T., "Laboratory Testing of Flours and Cookie Quality Research", Cereal Science Today, vol. 7, No. 4, pp. 98, 100, 102-104, 125, Apr. (1962).
Fuhr, F. R., "Cookie Spread", The Bakers Digest, vol. 36, No. 4, pp. 56-58, 78 (1962).
Brenneis, L. S., "Qualitative Factors in the Evaluation of Cookie Flours", The Bakers Digest, vol. 39, No. 1, pp. 66-69 (1965).
Matz, S. A. and Matz, T. D., Cookie and Cracker Technology, 2nd Ed., AVI Publishing Co., Inc., Westport, CT, pp. 6-15, 148-158, 232-234 (1978).
Pyler, E. J., Baking Science and Technology, vol. II, Siebel Publishing Co., Chicago, IL, pp. 609-613 (1952).

*Primary Examiner*—Blondel Hazel
*Assistant Examiner*—Elizabeth C. Weimar
*Attorney, Agent, or Firm*—Rose A. Dabek; Julius P. Filcik; Richard C. Witte

[57] ABSTRACT

A process for controlling the size and texture of baked cookies through the use of specific mixing procedures is disclosed. In particular, adding the required total amount and type of sugar in varying portions at different points in the dough mixing sequence permits control of the size and texture of cookies having distributed therein discrete regions of crumb-continuous storage-stable distinct textures.

6 Claims, No Drawings

MIXING PROCESS FOR COOKIES WITH STORAGE-STABLE TEXTURE VARIABILITY

RELATED APPLICATION

This is a continuation-in-part application of Ser. No. 530,564, filed Sept. 9, 1983, now abandoned.

TECHNICAL FIELD

The present application relates to a process for controlling the size and texture of baked cookies by use of specific mixing procedures.

BACKGROUND OF THE INVENTION

Mixing in general can be defined as an operation in which two or more distinct materials are brought by the application of force to a substantially homogeneous dispersion. Depending upon the type of baked goods being produced, the mixing procedure will differ with respect to the order of ingredient addition, the time and speed of mixing at the various stages, the temperature of the ingredients being used, and other factors. According to Matz, S. A. and Matz, T. D., *Cookie and Cracker Technology*, 2nd Ed., AVI Publishing Co., Inc., Westport, CT, p. 233 (1978), there are few guidelines applicable to development of mixing procedures for new products. Generally, the first approach is to draw up a proposed mixing method based on a procedure which has been found to be satisfactory for a somewhat similar product, and then make such changes as observations indicate are necessary.

It is known that cookie size is affected by the distribution of water between the starch and sugar in the cookie dough. Spreading of cookies during baking is directly proportional to the quantity of sugar present. Hydrophilic flour or other hydrophilic components which impede sugar dissolution decrease cookie size. Data on water migration shifts between components in inner and outer zones of heating doughs illustrate that the migration tendency of water is towards the hydrophilic starch in the hotter outer zones. Increasing the sugar content of the dough reduces this migration and causes a less viscous interior and greater lateral expansion. See Yamazaki, W. T., "Laboratory Testing of Flours and Cookie Quality Research", *Cereal Science Today*, Vol. 7, No. 4, pp. 98, 100, 102–104, 125, April 1962; and Brenneis, L. S., "Qualitative Factors in the Evaluation of Cookie Flours", *The Bakers Digest*, Vol. 39, No. 1, pp. 66–69 (1965). It is generally recognized that mixing procedures can affect water distribution between starch and sugar in cookie doughs. Details of how this water distribution changes as a function of order of ingredient addition, mixing speed and time, and temperature of ingredients are lacking, especially for laminated cookies made from multiple doughs containing different types of sugar.

Crumb-continuous cookies having a unique storage-stable texture dichotomy, that is crispy on the outside with a chewy interior, are made by manipulation of sugar crystallization in different parts of the cookie. Cookie size and texture is commonly controlled in commercial practice by altering the amount of water in the dough formula correlated with changes in oven baking conditions. See Matz, supra, at page 153 wherein availability of free water in the dough is described as the most important factor in controlling cookie spread during baking. However, this technique of altering dough water level is not preferred for cookies wherein sugar crystallization must be controlled to maintain a specific textural dichotomy. In addition, changes in the amount of water in the dough formula require corresponding changes in oven heating conditions. Oven heating conditions affect final cookie color and moisture level, i.e. texture. A method for maintaining uniform size, as well as the unique texture dichotomy of this type of cookie through control of mixing parameters, is desirable.

Accordingly, it is an object of this invention to provide a method for controlling the size and texture of baked cookies having dual textures controlled by sugar crystallization through use of the dough mixing procedure.

It is a further object of this invention to provide a method for controlling the size and texture of baked cookies through changing order of ingredient addition during dough preparation.

These and other objects of the invention will be evident from the following disclosure. All percents are by weight unless otherwise indicated.

DISCLOSURE OF THE INVENTION

This invention comprises a method for controlling the size and texture of baked cookies made from doughs having two types of sugars through changing the order of ingredient addition. In particular, the size and texture of the baked cookies are controlled by adding the required total amount and types of sugar in varying portions at different points in the sequence of ingredient addition during dough mixing.

One portion of the sugar is added initially with the liquid ingredients. The second portion of the sugar is added after preparation of a slurry of shortening with the liquid ingredients. The remaining portion of the sugar is added as a final step in the sequence after all other liquid and dry ingredients have been combined, excluding occlusions such as flavored chips, nuts, raisins, and the like. For convenience these points in the sequence of ingredient addition will hereinafter be referred to as at the beginning, midpoint, and end, respectively, for the first, second, and remaining portions as described. Dissolution of the sugar is achieved to a greater degree for the portions added earlier in the sequence of ingredient addition. Therefore, by changing the amount and type of sugar added at the various points in the mixing sequence, the cookie size and texture can be controlled.

The primary types of sugar employed herein are referred to as "readily crystallizable sugar" and "crystallization resistant sugar".

By "readily crystallizable sugar" is meant a mono- or disaccharide, or mixture of mono- and/or disaccharides, that readily and spontaneously crystallizes at the water content and water activity conditions encountered in semi-moist cookies of the home-baked type. Sucrose is virtually unique among the readily available food sugars in this regard, crystallizing spontaneously at water activity levels from about 0.25 to 0.8 in normal cookie systems. Mixtures of readily crystallizable sugars with other mono- and/or disaccharides, where readily crystallizable sugars comprise over 85% of the total sugar, exhibit crystallization behavior similar to a pure readily crystallizable sugar.

By "crystallization-resistant sugar" is meant a mono- or disaccharide, or mixture of mono- and/or disaccharides, which crystallizes, at the water content and water activity encountered in the semi-moist cookies of the home-baked type, substantially more slowly than sucrose under the same conditions, typically remaining uncrystallized for periods of at least 1-6 months. Particularly good crystallization resistant sugars are fructose, dextrose, and mixtures of sugars of which fructose and dextrose together comprise at least about 15% by weight, and solutions thereof. Others include psicose, fructose, sorbose, tagatose, allose, altrose, mannose, gulose, idose, galactose, talose, maltose, and lactose.

The term "crystallization-resistant sugar" also includes the combination of a readily crystallizable sugar with a sugar crystallization inhibitor.

By "sugar crystallization inhibitor" is meant a compound or composition which inhibits sucrose or other readily-crystallizable sugar crystallization in the baked cookie, so that the sugar crystallizes, at the water content and water activity encountered in semi-moist cookies of the home-baked type, substantially more slowly than the same sugar would under the same conditions in the absence of the inhibitor, preferably remaining uncrystallized for periods of at least 1-6 months. Particularly good sugar crystallization inhibitors include food-compatible polyols, such as sugar alcohols, sugar esters, sugar polymers, glycols, polyglycerols, polyglycerol esters, and starch hydrolysates. The sugar alcohols comprise a well known group of compounds, including sorbitol, mannitol, maltol and xylitol. Sugar esters comprising the disaccharide monoesters of the $C_{12}$-$C_{22}$ fatty acids, such as sucrose mono-oleate, can be employed. The sugar polymers including dextrins and cellulose are also useful. Other possible crystallization inhibitors include glycerol, polyglycerols, and polyglycerol esters having an average of two to ten glycerol units per polyglycerol moiety. The esters are preferably prepared with saturated fatty acids containing 14 to 22 carbon atoms. In any event, the crystallization inhibition capability and effective level of any material can be readily determined without undue experimentation by storage of mixtures of the material with the desired readily crystallizable sugar, either in standard solutions or in the intended cookie dough or crumb system. Crystallization can then be determined either by direct observation of crystal formation or by common X-ray diffraction techniques.

"Monosaccharides" and "disaccharides" as used herein are compounds well known to the art. Monosaccharides have the empirical formula $(CH_2O)_n$, where $n \geq 3$. The carbon skeleton of the common monosaccharides is unbranched and each carbon except one bears an —OH group; the remaining carbon is generally combined in an acetal or ketal linkage. Hexoses, both aldose and ketose forms, straight chain and pyranose or furanose forms, are preferred herein. The ketohexoses include psicose, fructose, sorbose and tagatose. The aldohexoses include allose, altrose, glucose, mannose, gulose, idose, galactose, and talose.

Disaccharides consist of two monosaccharides joined by a glycosidic linkage. The most common disaccharides are maltose, lactose and sucrose.

The term "water activity" ($a_w$) is used herein in its usual context to mean the ratio of the fugacity of water in the system being studied (f) to the fugacity of pure water ($f_o$) at the same temperature. The water activity of the products and compositions herein can be measured using well-known physical chemical techniques and commercially available instruments.

The cookies herein preferably comprise a laminated structure of a plurality of doughs wherein a first or inner dough is substantially enveloped within a distinct second or outer dough. The outer dough preferably contains a greater amount of readily crystallizable sugar, and the inner dough preferably contains a greater amount of crystallization-resistant sugar. For both doughs the crystallization-resistant sugar is preferably added initially with the liquid ingredients and the readily crystallizable sugar is proportioned between the two later points in the sequence. For the outer dough, the addition at the midpoint in the mixing sequence of an increasing amount of the total readily crystallizable sugar results in increasing crispness, brownness, and dryness of the outer region of the baked cookie. Alternatively, the addition at the midpoint in the mixing sequence of the outer dough of a decreasing amount of the total readily crystallizable sugar results in increasing paleness, and decreasing crispness of the outer regions of the baked cookie. For the inner dough, the addition at the midpoint of an increasing amount of the total readily crystallizable sugar results in increasing cookie diameter and chewiness. For the inner dough, the addition at the midpoint of a decreasing amount of the readily crystallizable sugar results in decreasing cookie diameter and chewiness with increasing dryness in the inner portion of the cookie.

Changes in sugar addition to the outer dough affect cookie size to a lesser degree than the same changes in sugar addition to the inner dough. However, when the inner dough is mixed in a manner which provides cookies of optimum size or overspread in size, the outer dough assumes a controlling effect on cookie size and changes in sugar addition during outer dough mixing are comparable to changes in inner dough mixing. Changes in outer dough mixing usually have a controlling effect on thickness. However, when the outer dough is mixed in a manner such that it is very stiff and viscous, the inner dough assumes a controlling effect on cookie thickness.

Controlling baked cookie size and texture is important to efficient manufacturing. Controlling baked cookie texture without large alterations in formula water levels is crucial to maintaining the unique texture dichotomy of this type of cookie.

DESCRIPTION OF PREFERRED EMBODIMENTS

The process of the present invention for controlling the size and texture of baked cookies comprises: (a) adding the crystallization-resistant sugar at the beginnng of the mixing procedure with other liquids; and (b) adding from about 0% to about 100% by weight of the readily crystallizable sugar at the midpoint of the mixing procedure, and the remaining 0% to 100% at the end of the mixing procedure. Preferably, this process is used to prepare multiple doughs which are combined to yield a crumb-continuous cookie having dual textures controlled by manipulation of sugar crystallization. Most preferably, these cookies comprise a laminated structure wherein a first or inner dough is substantially enveloped within a distinct second or outer dough. However, other laminated structures are included within the present invention and can be formed by a variety of techniques. Examples include applying a layer of one cookie dough to only the top part, or a portion of the top part, of a second dough; embedding particles or granules of one cookie dough in a piece of second dough; winding or otherwise distributing strands of extruded dough upon the surface of a second dough; winding or intertwining strands of extruded doughs; laminating sheets of distinct doughs and rolling and slicing to form a pinwheel structure; and a variety of other techniques well within the grasp of those in the food production art.

Although each dough can contain either or both types of sugar, i.e., readily crystallizable sugar and/or crystallization-resistant sugar, in the preferred execution the doughs containing primarily crystallization-resistant sugar will comprise baked cookie regions having a chewy texture and the doughs containing primarily readily crystallizable sugar will comprise baked cookie regions having a crisp texture. For the laminated structure most preferred, the first or inner dough will contain a greater amount of crystllization-resistant sugar surrounded by a second or outer dough containing a greater amount of readily crystallizable sugar.

For the inner dough containing a greater amount of crystallization-resistant sugar, this sugar is mixed in with the other liquid ingredients at the beginning of the mixing procedure. The minor amount of readily crystallizable sugar is then added in two portions at the midpoint and end of the mixing procedure. From about 0% to about 100% of this sugar can be added at the midpoint and the remainder at the end of the mixing procedure. Preferably, from about 20% to about 80% of this sugar is added at the midpoint and the remainder at the end of the mixing procedure. More preferably, from about 30% to about 70% of this sugar is added at the midpoint and the remainder at the end of the mixing procedure. Most preferable is to add 50% of the readily crystallizable sugar at the midpoint of the mixing procedure and 50% at the end of the mixing procedure.

If shear mixing of the ingredients is employed it is desirable when preparing the inner dough to mix the crystallization-resistant sugar with other liquid ingredients at the beginning of the mixing procedure followed by addition of the flour or other structure builders, and other dry ingredients. The readily crystallizable sugar is then added all at once and at the midpoint or end of the mixing procedure. In this situation where the work input into the dough is very high, it is desirable to maximize hydration of the flour or other structure builder to decrease cookie diameter and density.

Approximately for each 10% change in either direction the product diameter changes by about 0.005 to about 0.01 inch. Increases in the amount of readily crystallizable sugar added at the midpoint and decreases in the amount added at the end increases product diameter. Decreases in the amount of readily crystallizable sugar added at the midpoint and increases in the amount added at the end decreases product diameter. For example, adding 70% at the midpoint and 30% at the end produces a larger cookie diameter than adding 50% at both the midpoint and end, which in turn produces a larger cookie diameter than adding 30% at the midpoint and 70% at the end. This change in size is due primarily to the amount of sugar dissolved. Because flour is added between the two sugar portions, the sugar portion added at the end of the mixing sequence is not dissolved as readily because of competition with the flour for the liquid present.

The relative humidity of the environment must also be taken into consideration. In general, a higher relative humidity, unless compensated for, will effect dough in a manner which results in cookies with a larger diameter. Under conditions of low humidity, less than about 45%, a greater amount of the readily crystallizable sugar is added at the midpoint in the mixing process. For a relative humidity of medium range of from about 45% to about 65%, the addition of 50% of the readily crystallizable sugar at the midpoint and end is preferable. Under conditions of high humidity of greater than about 65%, a greater amount of the readily crystallizable sugar is added at the end of the mixing procedure. The effect of environmental humidity can vary dependent upon dough exposure in the manufacturing process employed. For example, processes wherein the dough is formed into sheets of large area can be more sensitive to humidity than processes wherein the dough is extruded in small deposits. The portions of sugar to be added at the midpoint and end of the mixing process must be optimized for each formula and manufacturing process for the environment.

Changes in sugar addition also effect product texture. Because the inner dough contains primarily crystallization-resistant sugars, it will correspond to baked cookie regions of chewy texture. However, increasing the amount of readily crystallizable sugar added at the midpoint of the mixing sequence with a corresponding decrease in the amount added at the end results in increasing moistness and chewiness unless formula changes or other parameters such as baking times and temperatures are altered. Alternatively, decreaseing the amount of readily crystallizable sugar added at the midpoint of the mixing sequence, with a corresponding increase in the amount added at the end, will decrease chewiness and increase dryness unless compensated for by other formula alterations or changes in baking conditions.

For the outer dough containing a greater amount of readily crystallizable sugar, the minor amount of crystallization-resistant sugar is mixed in with the liquid ingredients at the beginning of the mixing procedure. The readily crystallizable sugar is then added in two portions at the midpoint and end of the mixing procedure. From about 0% to about 100% of this sugar can be added at the midpoint and the remainder at the end of the mixing procedure. Preferably, from about 20% to about 80% of this sugar is added at the midpoint and the remainder at the end of the mixing procedure. More preferably, from about 30% to about 70% of this sugar is added at the midpoint and the remainder at the end of the mixing procedures. Most preferable is to add 50% at each point.

Approximately for each 10% change in either direction the cookie product diameter changes by about 0.005 to about 0.01 inch. Increasing the amount of readily crystallizable sugar added at the midpoint of the mixing procedure and decreases in the amount added at the end increases product diameter slightly. Decreases in the amount of readily crystallizable sugar added at the midpoint of the mixing procedure and increases in the amount added at the end decreases product diameter slightly. As with the inner dough mixing, flour is added between the two sugar portions changing the amount of sugar that is dissolved.

For various relative humidities, the same changes for sugar addition are made for the outer dough as previously described for the inner dough. Under conditions of low humidity, a greater amount of the readily crystallizable sugar is added at the midpoint in the mixing process, while under conditions of high humidity, a greater amount of the readily crystallizable sugar is added at the end of the mixing procedure.

Because the outer dough contains a greater amount of readily crystallizable sugar, it will correspond to baked cookie regions of crispy texture. However, increasing the amount of readily crystallizable sugar added at the midpoint of the mixing procedure with a corresponding decrease in the amount added at the end results in increasing crispness, brownness, and dryness of the outer regions of the baked cookie unless compensated for by formula changes or alterations in baking conditions. Alternatively, decreasing the amount of readily crystallizable sugar added at the midpoint of the mixing sequence, with a corresponding increase in the amount added at the end, results in increasing paleness and decreasing crispness of the outer cookie regions, unless otherwise controlled.

Changes in sugar addition to the outer dough affect cookie diameter to a lesser degree than the same changes in sugar addition to the inner dough. However, when the inner dough is mixed in a manner to provide cookies overspread in size, i.e., by adding about 90% to about 100% of the readily crystallizable sugar at the midpoint of the mixing procedure, the outer dough assumes a controlling effect on cookie size. In this case changes in sugar addition during outer dough mixing are comparable to similar changes in inner dough mixing.

Cookie thickness is related inversely to cookie diameter, and can be controlled by regulating cookie diameter through dough mixing procedures. A change in cookie diameter of from about 0.03 to about 0.04 inch will typically cause a change in thickness of about 0.01 inch. Independent of diameter, changes in outer dough mixing usually affect cookie thickness to a greater degree than changes in inner dough mixing. The addition at the end of the mixing sequence of an increasing amount of from about 50% to about 100% of the readily crystallizable sugar results in increasing outer dough viscosity. A viscous outer dough will result in cookies of increased thickness. As a greater amount of the readily crystallizable sugar is added at the midpoint of the mixing procedure for the inner dough, the inner dough becomes less viscous, and the outer dough then exerts a greater control on thickness. However, if the outer dough is mixed in a manner to be of minimal viscosity by adding about 90% to about 100% of the readily crystallizable sugar at the midpoint of the mixing procedure, and the inner dough is more viscous than the outer, the inner will exert a controlling effect on cookie thickness. Attributes outside of the mixing procedure, such as level of baking soda in the doughs, and level of baking heat, also affect cookie thickness.

Changes in cookie texture overall are dependent upon whether the changes in sugar addition for the inner and outer doughs work in conjunction or in opposition to each other. For example, adding a major amount of the readily crystallizable sugar at the midpoint in the mixing procedure for both doughs will result in cookies with a very large diameter and a chewy, moist inner region and crisp outer region. Adding a major amount of the readily crystallizable sugar at the end of the mixing procedure for both doughs will result in cookies having a small diameter with a dry inner region and less crisp outer region. Adding a major amount of the readily crystallizable sugar at the midpoint of the mixing procedure for the inner dough and at the end of the mixing procedure for the outer dough results in cookies of larger diameter with a less crisp moist texture. Alternatively, adding a major amount of the readily crystallizable sugar at the end of the mixing procedure for the inner dough and at the midpoint of the mixing procedure for the outer dough will result in cookies of smaller diameter with a crisp texture. These four cases represent the extremes of texture, but illustrate its variability as depicted on Table A. For Table A the crystallization-resistant sugar is always added at the beginning of the mixing procedure.

TABLE A

| | Readily Crystallizable Sugar Addition | Inner Dough | Outer Dough | Cookie Diameter | Cookie Texture |
|---|---|---|---|---|---|
| A. | Midpoint | 50% | 50% | Average | Crispy Outer |
| | End | 50% | 50% | | Chewy inner |
| B. | Midpoint | 100% | 100% | Larger | Crisp, hard outer |
| | End | 0% | 0% | | Moist inner |
| C. | Midpoint | 0% | 0% | Smaller | Less Crisp Outer |
| | End | 100% | 100% | | Dry inner |
| D. | Midpoint | 100% | 0% | Larger | Less Crisp outer |
| | End | 0% | 100% | | Moist inner |
| E. | Midpoint | 0% | 100% | Smaller | Crisp, hard outer |
| | End | 100% | 0% | | Dry inner |

TESTING METHOD FOR TEXTURE

A penetrometer, available from Precision Scientific Company, 3737 W. Cortland, Chicago, IL 60647, was employed to measure penetration of doughs and cookies as a means of measuring texture. The instrument dial was calibrated at zero and the test probe positioned at a constant height of 2 cm. above the sample surface. The test probe needle was released and permitted to penetrate the sample and settle for 10 seconds. The depth gauge was then engaged to fix the dial reading, which was recorded in millimeters. For each test 3 penetrations were conducted on each sample, one at the center, and the others between the center and the edge on opposite sides. The three readings were averaged to calculate one value for each sample. Dough samples were contained within a sample cup. Baked cookie samples were placed on the penetrometer sample shelf without a container.

EXAMPLE 1

| Ingredients | Percent by Weight |
|---|---|
| First Dough | |
| Hydrogenated vegetable shortening | 15.5 |
| Sugar | 9.5 |
| High fructose corn syrup | 26.4 |
| Flour | 24.6 |
| Flavoring and minor ingredients | 3.7 |
| Chocolate chips | 20.3 |
| Second Dough | |
| Hydrogenated vegetable shortening | 16.5 |
| Sugar | 30.4 |
| High fructose corn syrup | 4.5 |
| Flour | 37.4 |

| Ingredients | Percent by Weight |
|---|---|
| Molasses | 1.5 |
| Flavor and minor ingredients | 1.0 |
| Water | 8.7 |

Each of the above doughs was prepared in a constant-temperature room maintained at 70° F. (21° C.) using a Hobart Model C-100 mixer by three different methods as follows: The chocolate chips were omitted for this example.

A. Sugar at Midpoint

The first dough, 1A, was prepared by mixing the high fructose corn syrup, liquid flavorings, and hydrogenated vegetable shortening for about five minutes. One half of the sugar was then added and mixed briefly, followed by the addition of the second half of the sugar and mixing. The minor ingredients were added and mixed. The flour was added and mixed.

The second dough, 2A, was prepared by mixing the high fructose corn syrup, water, liquid flavorings, hydrogenated vegetable shortening and molasses for about five minutes. One half of the sugar was added and mixed briefly, followed by the addition of the second half of the sugar and mixing. The minor ingredients were added and mixed. The flour was added and mixed.

B. Sugar at Midpoint and End

The first dough, 1B, was prepared by mixing the high fructose corn syrup, liquid flavorings, and hydrogenated vegetable shortening for about five minutes. One half of the sugar was mixed in. The flour was added and mixed in two portions. The minor ingredients were then added with mixing. Finally the remaining half of the sugar was mixed in.

The second dough, 2B, was prepared by mixing the high fructose corn syrup, liquid flavorings, water, hydrogenated vegetable shortening, and molasses for about five minutes. One half of the sugar was added and mixed. The flour, and then the minor ingredients, were mixed in. The remaining half of the sugar was then added and mixed.

C. Sugar at End

The first dough, 1C, was prepared by mixing the high fructose corn syrup, liquid flavorings, and hydrogenated vegetable shortening for about five minutes. The flour was added and mixed in, followed by the minor ingredients. Then the sugar was added and mixed.

The second dough, 2C, was prepared by mixing the high fructose corn syrup, liquid flavorings, water, hydrogenated vegetable shortening and molasses for about five minutes. The flour was added and mixed. The minor ingredients were added and mixed. Finally the sugar was added and mixed.

The six doughs were each baked separately. Dough balls of about 12.2 grams each were prepared from each of the doughs after aging one hour, and baked on an aluminum cookie tray for about 7¾ minutes at about 375° F. (191° C). Cookie diameter, thickness, and weight were measured on the baked cookies after cooling. Data is summarized in Table 1.

TABLE 1

| Dough | Cookie Diameter, Inches | Cookie Thickness, Inches | Cookie Weight, Grams |
|---|---|---|---|
| 1A | 2.21 | 0.34 | 11.35 |
| 1B | 2.15 | 0.33 | 11.28 |
| 1C | 2.11 | 0.35 | 11.38 |
| 2A | 2.21 | 0.30 | 11.35 |
| 2B | 2.14 | 0.30 | 11.40 |
| 2C | 2.13 | 0.30 | 11.52 |

The above experiment was repeated with six doughs prepared in constant temperature rooms maintained at 80° F. (27° C.), 90° F. (32° C.), and three times at ambient temperature. Penetration data on the doughs was obtained at periodic time intervals up to 24 hours. Cookie diameter, thickness, weight, and penetration were measured on the baked cookies after cooling. The average of all data, including that of Table I, is shown in Table II.

TABLE II

| Dough | Cookie Diameter, Inches | Cookie Thickness, Inches | Cookie Weight, Grams | Dough Penetration, mm | Cookie Penetration, mm |
|---|---|---|---|---|---|
| 1A | 2.06 | 0.36 | 11.38 | 392 | 127 |
| 1B | 2.03 | 0.36 | 11.36 | 390 | 131 |
| 1C | 2.00 | 0.37 | 11.35 | 374 | 138 |
| 2A | 2.10 | 0.33 | 11.35 | 287 | 92 |
| 2B | 2.05 | 0.33 | 11.21 | 274 | 103 |
| 2C | 2.05 | 0.33 | 11.31 | 186 | 131 |

For the experiment conducted in the 90° F. (32° C.) constant temperature room, cookie color was noted. For doughs 1A, 1B, and 1C the appearance of the cookies was about equivalent upon visual inspection. For doughs 2A, 2B, and 2C cookie color was not equivalent upon visual inspection. The darkest brown color occurred in cookies baked from dough 2A (sugar at midpoint), an intermediate brown color occurred in cookies baked from dough 2B (sugar at midpoint and end), and the lightest brown color occurred in cookies baked from dough 2C (sugar at end).

EXAMPLE 2

The dough formulas of Example 1 were prepared adding the readily crystallizable sugar at the midpoint and end as described in Section B of Example 1 and laminated together prior to baking.

The first dough was prepared as follows. A Peerless Mixer Model 950 with a capacity of 2100 pounds was charged with the preweighed, high fructose corn syrup and liquid flavorings. One of the minor ingredients was added and the automatic mixer jacket cooler engaged to control temperature in the range of from about 75° F. to about 80° F. (24° C. to 27° C.). The ingredients were mixed for about 60 seconds. The preweighed and preheated hydrogenated vegetable shortening was then added and blended for about 90 seconds. One half of the preweighed, readily crystallizable sugar was mixed in until dissolved. The flour, remaining flavorings and minor ingredients were added and mixed for approximately 3 minutes until the dough was homogeneous. The remaining half of the sugar was charged into the mixer and blended until the dough was homogenous. Finally, the chocolate chips were briefly mixed in.

The second dough was prepared as follows. The water, molasses, liquid flavorings and one of the minor ingredients were preweighed and combined. After charging a Readco Mixer of 225 gallon capacity with the high fructose corn syrup, the above mixture is added. The mixer cooler jacket is engaged to control the temperature in the range of about 70° F. to about 75° F. (21° C. to 24° C.). The ingredients are blended until homogeneous, for approximately 60 seconds. The hydrogenated vegetable shortening is then charged to the mixer and blended for about 3.5 minutes. One half of the preweighed, readily crystallizable sugar is added and mixed until dissolved. The flour is charged to the mixer and the remaining flavorings and minor ingredients sprinkled evenly over it. The mixer is run for about 55 seconds until dough is homogenous. The remaining one half of the sugar is added and blended until the dough is homogenous.

The second dough was extruded into a sheet about 2–4 mm. in thickness onto a continuously moving belt. Discrete hemispherical deposits of the first dough of about 8.0 grams in weight were placed upon the sheet of second dough in an ordered pattern by means of a rotary molder. The second dough was extruded into a sheet about 2–4 mm. in thickness and placed over the lower sheet and deposits. The top sheet was tamped into place with a roller. The dough sheets were cut around the deposits of first dough to yield multiple cookie preforms of about 12.5 grams each. The preforms were then repositioned and rolled to substantially hemispherical shape using an orbiting cup device. The deposit of first dough was substantially uniformly encapsulated within an outer layer of the second dough. The top surface of the outer layer of dough was smeared during rolling to increase the visibility of or to expose the chocolate chips in the inner dough. The rolled preforms were transferred to an oven band and baked for about 8.5 minutes in a recirculating indirect gas-fired oven. The upper zones were maintained at a temperature of 330° F.±10° F. (165.5° C.±5.5° C.) and the bottom zones were maintained at a temperature of about 280° F.±5° F. (137.8° C.±2.8° C.). The cookies had an average diameter of from about 2.0 to about 2.2 inches (5.1 to 5.6 cm.), an average thickness of 0.3 inches, and an average weight of from about 11.5 to about 12.0 grams. The cookies had a dual texture of crispy on the outside with a chewy interior.

What is claimed is:

1. A process for preparing baked cookies having a crisp and chewy texture dichotomy, comprising making at least two dough compositions, one dough comprising flour, shortening, water and a sufficient amount of crystallization resistant sugar to provide a chewy texture when baked, and a second dough comprising flour, shortening, water and a sufficient amount of readily crystallizable sugar to provide a crisp texture when baked, at least one dough composition made by:
    (a) adding crystallization resistant sugar with water and mixing same;
    (b) combining an effective amount of shortening for producing cookie dough with the crystallization-resistant sugar and water and mixing the combination;
    (c) adding to the ingredients of step (b) not more than about 80% by weight of a readily crystallizable sugar comprising sucrose, based on total weight of readily crystallizable sugar in each dough composition, and mixing;
    (d) combining an effective amount of flour for producing cookie dough when combined with the mixed ingredients from step (c) and mixing the combination;
    (e) adding the remaining readily crystallizable sugar to the mixed ingredients of step (d), and mixing;
    (f) forming a cookie dough preform from the dough composition from step (e) and a second dough; and
    (g) baking said cookie preform for sufficient time to form a cookie with crispy and chewy texture dichotomy.

2. The process of claim 1 wherein the crystallization-resistant sugar comprises a combination of a readily crystallizable sugar and a crystallization inhibitor.

3. The process of claim 1 wherein from about 30% to about 70% by weight of the readily crystallizable sugar is added in step (c) and the remaining 30% to 70% is added in step (e).

4. The process of claim 3 wherein about 50% by weight of the readily crystallizable sugar is added in step (c) and the remaining 50% is added in step (e).

5. The process of claim 1 wherein one layer of said dough containing crystallization resistant sugar is substantially enveloped by one layer of said dough containing readily crystallizable sugar to prepare a single crumb-continuous baked cookie.

6. The process of claim 1 wherein the percent by weight of readily crystallizable sugar added in step (c) is selected so as to result in a baked cookie product of predetermined diameter and thickness.

* * * * *